United States Patent
Kawabe

(10) Patent No.: US 7,740,949 B2
(45) Date of Patent: Jun. 22, 2010

(54) WATER-BASED ADHESIVE FOR POLARIZING ELEMENT AND POLARIZER OBTAINED WITH THE SAME

(75) Inventor: Kazuyuki Kawabe, Saitama (JP)

(73) Assignees: Nippon Kayaku Kabushiki Kaisha, Tokyo (JP); Polatechno Co., Ltd., Joetsu-Shi (JP)

( * ) Notice: Subject to any disclaimer, the term of this patent is extended or adjusted under 35 U.S.C. 154(b) by 216 days.

(21) Appl. No.: 10/591,015

(22) PCT Filed: Mar. 3, 2005

(86) PCT No.: PCT/JP2005/003633
§ 371 (c)(1),
(2), (4) Date: Oct. 16, 2006

(87) PCT Pub. No.: WO2005/085383
PCT Pub. Date: Sep. 15, 2005

(65) Prior Publication Data
US 2007/0178251 A1    Aug. 2, 2007

(30) Foreign Application Priority Data
Mar. 3, 2004    (JP) .............................. 2004-059254

(51) Int. Cl.
*B32B 23/08*    (2006.01)
(52) U.S. Cl. ........................ 428/507; 428/500; 156/327
(58) Field of Classification Search ................ None
See application file for complete search history.

(56) References Cited

U.S. PATENT DOCUMENTS

| | | | |
|---|---|---|---|
| 4,073,756 A | * | 2/1978 | Yotsuyanagi et al. ..... 106/200.3 |
| 4,119,463 A | * | 10/1978 | Iguchi et al. ................ 430/630 |
| 6,905,640 B2 | * | 6/2005 | Tanaka ...................... 264/1.34 |

FOREIGN PATENT DOCUMENTS

| | | |
|---|---|---|
| EP | 0 413 136 | 2/1991 |
| EP | 0 668 513 | 8/1995 |
| JP | 49-93446 | 11/1972 |
| JP | 3-7230 | 2/1991 |
| JP | 9-292524 | 11/1997 |
| JP | 9-292525 | 11/1997 |
| JP | 10-193493 | 7/1998 |
| JP | 2001-100032 | 4/2001 |
| JP | 2001-166146 | 6/2001 |
| JP | 2002-331616 | 11/2002 |
| JP | 2003307623 A * | 10/2003 |
| JP | 2005049779 A * | 2/2005 |
| WO | 02/055626 | 7/2002 |

OTHER PUBLICATIONS

The International Search Report dated Jun. 14, 2006.
Database CA [Online] Chemical Abstracts Service, Columbus, Ohio, US: XP002512422; JP2001348550, Jan. 17, 2002.
Database CA [Online] Chemical Abstracts Service, Columbus, Ohio, US: XP002512423; JP48061545, May 12, 1984.
Database WPI Week 199750; Thomson Scientific, London, GB; AN 1997-540445; XP002512450; JP9258023, Oct. 3, 1997.
The European communication dated Feb. 5, 2009.

* cited by examiner

*Primary Examiner*—Monique R Jackson
(74) *Attorney, Agent, or Firm*—Nields, Lemack & Frame, LLC

(57) ABSTRACT

A water-based adhesive for polarizing elements which comprises a polyvinyl alcohol resin, a resin having a maleic anhydride skeleton in the structure, and a crosslinking agent in a weight proportion of 100/(1-1,000)/(0.5-5,000). It is easy to handle because it is of the water-based one-pack type. The adhesive has sufficient adhesion strength even in a high-temperature high-humidity atmosphere. The adhesive contains boron in a high concentration and is effective also in the bonding of polarizing elements, for which conventional adhesives have been insufficient in adhesion strength.

12 Claims, No Drawings

WATER-BASED ADHESIVE FOR POLARIZING ELEMENT AND POLARIZER OBTAINED WITH THE SAME

TECHNICAL FIELD

The present invention relates to a water-based adhesive for polarizing elements and a polarizer obtained using the water-based adhesive. More particularly, it relates to a water-based adhesive for polarizing elements which is excellent in adhesion of a polarizing element and a protective film and is improved, particularly, in adhesion durability in an atmosphere of high temperature and high humidity, and a polarizer obtained using the adhesive.

BACKGROUND ART

At present, polarizers are produced generally by laminating a protective film such as a cellulose acetate film on at least one side of a polarizing element comprising a stretched and orientated film of polyvinyl alcohol (hereinafter abbreviated as "PVA") or a derivative thereof containing iodine or a dichroic dye using an aqueous solution containing a PVA resin as an adhesive.

Polarizers having such construction have the defect that the polarizing element and the protective film are apt to separate from each other upon being exposed to high temperature for a long time. Recently, liquid crystal display devices are used in desk electronic calculators, electronic watches or clocks, personal computers, cellular phones and instruments used in automobiles and machines, and are used or stored under severer environmental conditions. Thus, there sometimes occurs the problem that the polarizing element and the protective film separate from each other, particularly, in a high humidity atmosphere to cause deterioration of display quality of the liquid crystal display devices. For improving the strength of adhesives, there is a method of accelerating the reaction of adhesive components, and, in this case, the usable life, so-called, jar life in the state of solution becomes shorter, and hence it is necessary to use two-pack type adhesives. However, one-pack type adhesives have been desired for improving productivity.

Non-Patent Document 1 discloses a general method for improving water resistance of PVA resin-based adhesives.

Patent Document 1 and Patent Document 2 disclose that adhesives comprising a PVA resin, a resin having a maleic anhydride skeleton in the structure and a crosslinking agent are used as wood adhesives.

Patent Document 1: JP-A-49-93446
Patent Document 2: JP-B-03-7230
Non-Patent Document 1: "POVAL" written by Nagano, Yamane and Toyoshima, and published from Polymer Publication Society, on Apr. 1, 1981, pages 256-261

DISCLOSURE OF INVENTION

Problem to be Solved by the Invention

An object of the present invention is to provide an adhesive for polarizing element for providing a polarizer which comprises a polarizing element, particularly, a polarizing element containing a boron compound and a protective film and which is inhibited from separation between the polarizing element and the protective film in a high-humidity atmosphere and excellent in durability. Another object of the present invention is to provide a polarizer obtained by using the adhesive for polarizing element.

Means for Solving the Problem

As a result of intensive research conducted by the inventors in an attempt to attain the above objects, it has been found that the above objects can be attained by using an adhesive containing a PVA resin, a resin having a maleic anhydride skeleton in the structure, and a crosslinking agent as an adhesive for polarizer, and a one-pack type adhesive having a sufficient pot life can be obtained. Thus, the present invention has been accomplished.

That is, the present invention relates to a water-based adhesive for polarizing elements which contains a polyvinyl alcohol resin, a resin having a maleic anhydride skeleton in the structure, and a crosslinking agent.

Furthermore, the present invention relates to a polarizer comprising a polarizing element and a protective film bonded to the polarizing element with an adhesive, characterized in that the adhesive is the above water-based adhesive for polarizing elements.

Advantages of the Invention

By bonding a polarizing element and a protective film using the water-based adhesive for polarizing elements of the present invention, occurrence of separation between the polarizing element and the protective film can be inhibited, and the resulting polarizer can be used and stored in an atmosphere of high temperature and high humidity, which has been impossible for conventional polarizers.

Furthermore, heat resistance, high-temperature and high-humidity resistance, and heat and light resistance of a polarizer can be improved by increasing the content of boron compound in the polarizing element, and the water-based adhesive for polarizing element of the present invention can give particularly excellent effect on adhesion between the polarizing element and the protective film which is deteriorated due to increase of the boron compound. That is, the water-based adhesive for polarizing element of the present invention exerts particularly excellent effect on adhesion between the polarizing element and the protective film even when the content of the boron compound in the polarizing element is increased to about 25-40% by weight in terms of boric acid over the content of about 13-25% by weight which is generally employed in conventional polarizing elements.

BEST MODE FOR CARRYING OUT THE INVENTION

The water-based adhesive for polarizing element according to the present invention comprises a PVA resin, a resin having a maleic anhydride skeleton in the structure, and a crosslinking agent as essential components.

The PVA resin used in the water-based adhesive for polarizing element of the present invention may be a modified PVA resin or a mixture of a PVA resin and a modified PVA resin. As the modified PVA resins, there may be used saponification products of copolymers of vinyl acetate and unsaturated carboxylic acids or derivatives thereof, olefins, vinyl ethers, unsaturated sulfonates, or the like, or reaction products of PVA resins with aldehydes, methylol compounds, epoxy compounds, isocyanates, or the like. The modified PVA resins are preferably modified PVA resins having carboxyl group, more preferably modified PVA resins having acetoacetyl group.

The average saponification degree of the PVA resins used in the water-based adhesive for polarizing element of the present invention is 85 mol % or higher, preferably 98 mol % or higher. The average polymerization degree of the PVA resins may be optional, and preferably 500 or higher, more preferably 1000-5000.

As the resins having a maleic anhydride skeleton in the structure used in the water-based adhesive for polarizing element of the present invention, mention may be made of copolymers of maleic anhydride and α-olefins. The α-olefins mean straight chain or branched chain olefins having a carbon-carbon double bond at α-position, and particularly those which have 2-12 carbon atoms, especially those which have 2-8 carbon atoms. Examples of the usable α-olefins are ethylene, propylene, n-butene, isobutylene, n-pentene, isoprene, 2-methyl-1-butene, n-hexene, 2-methyl-1-pentene, 3-methyl-1-pentene, 4-methyl-1-pentene, 2-ethyl-1-butene, 1,3-pentadiene, 1,3-hexadiene, 1,4-hexadiene, 2,3-dimethylbutadiene, 2,4,4-trimethyl-1-pentene, 2-methyl-1,3-pentadiene, 2,5-heptadiene, 1,3-heptadiene, 2-methyl-1,3-hexadiene, 1,3-octadiene, etc. Among them, especially preferred are copolymers of isobutylene. As the isobutylene, there may be used RETURN B•B (mixtures of isobutylene, 1-butene, 2-butene, and the like). These olefins may be used each alone or in combination of two or more.

The weight average molecular weight of the copolymers of maleic anhydride and isobutylene is preferably 55,000-350,000. If the molecular weight is too high, viscosity of the adhesive is too high and coatability is inferior. If the molecular weight is too low, water resistance is not sufficient.

The resins having a maleic anhydride skeleton in the structure may contain maleamic acid or a salt thereof in the structure together with maleic anhydride. The method for introducing maleamic acid or a salt thereof into the structure may be either amidation of maleic anhydride or copolymerization of maleic anhydride with maleamic acid or a derivative thereof.

The resins having a maleic anhydride skeleton in the structure may contain maleimide in the structure together with maleic anhydride. The method for introducing maleimide into the structure may be either imidation of maleic anhydride or copolymerization of maleic anhydride with maleimide. Examples of maleimides are maleimide; N-substituted alkylmaleimides such as N-methylmaleimide, N-ethylmaleimide, N-propylmaleimide, N-n-butylmaleimide, N-t-butylmaleimide and N-cyclohexylmaleimide; N-substituted alkylphenylmaleimides such as N-methylphenylmaleimide and N-ethylphenylmaleimide; N-alkoxyphenylmaleimides such as N-methoxyphenylmaleimide and N-ethoxyphenylmaleimide; and halides of them, such as N-chlorophenylmaleimide. Among them, maleimide is preferred.

Of the resins having a maleic anhydride skeleton in the structure, in the case of those which are readily soluble in water, even water alone can be used as a solvent, but in the case of those which are not readily soluble in water or insoluble in water, they are dissolved in water containing a basic substance. The basic substances include, for example, ammonia, and carbonate, phosphate or acetate of ammonia; organic amines such as monoethanolamine, diethanolamine, triethanolamine and other alkanolamines, aliphatic amines, and aromatic amines; and inorganic salts such as oxides, hydroxides or carbonates of alkaline earth metals and hydroxides, carbonates, silicates, phosphates and acetates of alkali metals. Among them, preferred are ammonia, carbonate of ammonia, organic amines, oxides, hydroxides or carbonates of alkaline earth metals and hydroxides or carbonates of alkali metals. These can be used each alone or in combination of two or more.

The crosslinking agents used in the present invention may be those which react with the PVA resin and the resin having a maleic anhydride skeleton in the structure to cause crosslinking of them, and preferred are compounds having epoxy group. Examples of the crosslinking agents are glyoxal, formalin, borax, boric acid, aziridine, dialdehyde starch, melamine resin, polyamide resin, polyethyleneimine resin, polyamide•epichlorohydrin resin, ketone•aldehyde resin, glycine, glycidyl ester, glycidyl ether, ketene dimer, dimethylolurea, ammonium chloride, magnesium chloride, calcium hydroxide, zirconium carbonate•ammonium, etc., and preferred are polyglycidyl ethers of polyols and adducts of diamine with glycidyl.

The weight proportion of the PVA resin and the resin having a maleic anhydride skeleton in the structure in the water-based adhesive for polarizing element of the present invention is 100/1-1000, preferably 100/10-1000, more preferably 100/50-500. The weight proportion of the PVA resin and the crosslinking agent in the adhesive is 100/0.5-5000, preferably 100/1-1000, more preferably 100/5-500.

The water-based adhesive for polarizing element of the present invention can be easily prepared by dissolving the PVA resin, the resin having a maleic anhydride skeleton in the structure and the crosslinking agent in water or water containing a basic substance in the proportion as mentioned above. The concentration including the resins and the crosslinking agent is preferably 2-30% by weight, more preferably 2-10% by weight.

The polarizer of the present invention comprises a polarizing element and a protective film which are bonded to each other using the water-based adhesive for polarizing element of the present invention. The polarizing element used in the polarizer of the present invention is preferably a PVA resin film, especially preferably a uniaxially stretched PVA resin film. The PVA resin used for the film is produced usually by saponification of polyvinyl acetate, but the starting material is not necessarily limited to polyvinyl acetate, and may contain a component copolymerizable with vinyl acetate, such as unsaturated carboxylic acids or derivatives thereof, olefins, vinyl ethers and unsaturated sulfonates. The average saponification degree of the PVA resin is suitably 85% or higher, preferably 98% or higher. The average polymerization degree of the PVA resin used in the present invention may be optional, and is usually 1500 or higher, preferably 2300-5000.

The polarizing element used in the polarizer of the present invention is usually produced by a method of dyeing a PVA resin film in an aqueous solution of iodine or a dichroic dye and then uniaxially stretching the film by a wet method or a-dry method. It can also be produced by a method of carrying out simultaneously the dyeing and the stretching, a method of carrying out the dyeing after stretching, or a method of stretching a PVA resin film prepared with addition of a substance having dichroism during preparation of the film.

As the dichroic dyes, known dyes can be used, and examples of them are C.I. Direct Yellow 12, C.I. Direct Yellow 28, C.I. Direct Yellow 44, C.I. Direct Orange 26, C.I.

Direct Orange 39, C.I. Direct Orange 107, C.I. Direct Red 2, C.I. Direct Red 31, C.I. Direct Red 79, C.I. Direct Red 81, C.I. Direct Red 247, C.I. Direct Green 80, C.I. Direct Green 59, and the dyes which are disclosed in JP-A-59-145255, JP-A-60-156759, JP-A-3-12606, JP-A-11-218610 and JP-A-2001-33627. These dyes are used generally as free acids, alkali metal salts, ammonium salts and amine salts. They may be used each alone and, if necessary, in combination of two or more. There is no limitation in the dyes used in combination, and preferred are those which have absorption characteristics in different wavelength regions and are high in dichroism.

In producing a polarizing element containing boron which is used for the polarizer of the present invention, there may be employed, for example, a method of dipping a PVA resin film in an aqueous solution containing boric acid before or after dyeing and a method of dipping a PVA resin film in a dyeing solution containing boric acid to carrying out simultaneously the dyeing. The method of dipping a PVA resin film in an aqueous solution containing boric acid after dyeing is preferred in the present invention. When the PVA resin film is stretched, it is preferred to carry out uniaxial stretching in the aqueous solution containing boric acid in which the PVA resin film is dipped after dyeing. If the PVA resin film after uniaxially stretched is further dipped in an aqueous solution containing boric acid, the concentration of boric acid can be controlled without changing the optical characteristics obtained by the uniaxial stretching. In this case, the concentration of boric acid in the aqueous solution is preferably 1-20% by weight and the solution temperature is preferably 20-80° C. The boron content in the commercially available polarizers is about 13-25% by weight in terms of the concentration of boric acid, and if it is higher than 25% by weight, heat resistance and light resistance are improved. However, if the boron content in the polarizing element is too high, adhesion lowers and hence the boron content is preferably 10-40% by weight in terms of the concentration of boric acid. Taking into consideration the heat resistance and light resistance, it is preferably 25-40% by weight. As the boron compound, borax or the like can also be used. If necessary, a step of water washing can be added to the above film production steps.

The polarizer of the present invention is obtained by laminating a protective film excellent in optical transparency and mechanical strength on one or both sides of the above polarizing element using the adhesive for polarizing element of the present invention. As the protective film, there are used, for example, cellulose acetate films such as cellulose diacetate film and cellulose triacetate, and besides acrylic films, fluorine-based films such as ethylene tetrafluoride/propylene hexafluoride, polyester resin films, polyolefin resin films, polycycloolefin resin films, and polyamide resin films. Furthermore, as the protective films, there may also be used the above-mentioned resin films, the surface of which has been pretreated with a material which improves the adhesion, such as a PVA resin. Moreover, the protective films may be films having a function of retardation film or viewing angle expansion film, such as those which have phase difference by themselves or those which are coated with a liquid crystal compound or the like. It is further effective to subject the surface of the protective films to saponification treatment with alkalis, corona discharge treatment, glow discharge treatment, electron radiation treatment or high-frequency treatment. It is also possible to subject the surface of the protective films to a pretreatment with a material which improves adhesion to the polarizing element.

A transparent protective layer may further be provided on the surface of the polarizer of the present invention. As the protective layer, mention may be made of, for example, an acrylic or polysiloxane hard coat layer and a urethane protective layer. Moreover, in order to further improve visibility of liquid crystal display devices, an AR (anti-reflection) layer, an LR (low reflection) layer or an AG (anti-glaring) layer can also be provided on the protective layer each alone or in combination. The AR layer and LR layer can be formed by vapor deposition or sputtering of materials such as silicon oxide, titanium oxide or magnesium fluoride, or by thinly coating a fluorine-based material. The AG layer can be formed, for example, by dispersing a filler in a hard coat layer. The polarizer of the present invention can be used as an elliptical polarizer by laminating a phase difference plate thereon.

The present invention will be explained in more detail by the following examples and test examples, which should not be construed as limiting the invention. In the examples, "part" means "part by weight" and "%" means "% by weight" unless otherwise notified. The content of boron compound in the polarizing element is calculated in terms of the amount of boric acid which is obtained by dissolving the polarizing element in distilled water with heating and carrying out neutralization titration with sodium hydroxide.

EXAMPLE 1

50 Parts of an aqueous solution containing 5.0% of a PVA resin (having an average polymerization degree of 2600 and a saponification degree of 99.4 mol % or higher), 50 parts of an aqueous ammonium solution containing 5.0% of a resin having a maleic anhydride skeleton in the structure (trade name: ISOBAN-18 manufactured by Kuraray Co., Ltd.; a copolymer of maleic anhydride and isobutylene having a weight average molecular weight of 300,000-350,000) and 1.25 parts of polyglycerol polyglycidyl ether (trade name: DENACOL EX-521 manufactured by Nagase Chemtex Co., Ltd.) were mixed to obtain a water-based adhesive for polarizing element of the present invention. Then, a PVA film having an average polymerization degree of 4000, a saponification degree of 99.9 mol % and a thickness of 75 μm was dyed in an aqueous solution containing Glauber's salt and a dichroic dye disclosed in JP-A-2001-33627 and represented by the following formula (1) as a free acid at 45° C. for 4 minutes, and then film was introduced into an aqueous solution containing 3% by weight of boric acid at 58° C. without a drying step and uniaxially stretched fivefold in the aqueous solution. This film was washed by further dipping in a water bath of room temperature and dried at 70° C. for 10 minutes to obtain a polarizing element. This polarizing element and a cellulose triacetate film subjected to saponification treatment with an alkali were bonded to each other using the water-based adhesive obtained above, and dried at 70° C. for 5 minutes and, furthermore, at 100° C. for 5 minutes to obtain a polarizer of the present invention. In this case, the boron content in the polarizing element was 16% in terms of concentration of boric acid.

[Formula 1]

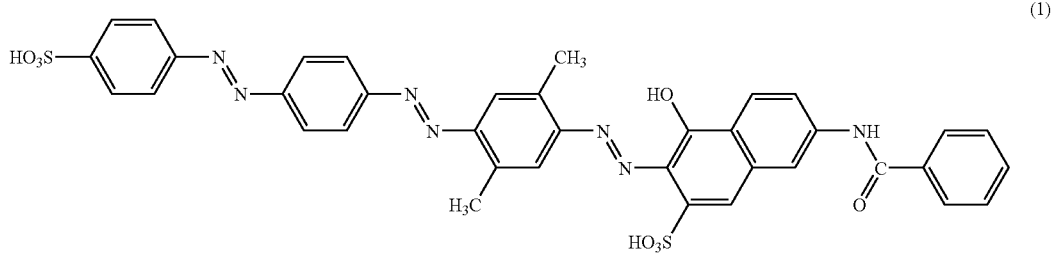

(1)

EXAMPLE 2

A water-based adhesive for polarizing element of the present invention was obtained in the same manner as in Example 1, except that the concentration of the PVA resin in the aqueous solution was 4.0%, and the concentration of the resin having a maleic anhydride skeleton in the structure in the aqueous ammonium solution was 4.0%. Then, a polarizer was obtained using the resulting adhesive in the same manner as in Example 1.

EXAMPLE 3

67 Parts of an aqueous solution containing 5.0% of a PVA resin (having an average polymerization degree of 2600 and a saponification degree of 99.4 mol % or higher), 33 parts of an aqueous ammonium solution containing 5.0% of a resin having a maleic anhydride skeleton in the structure (trade name: ISOBAN-18 manufactured by Kuraray Co., Ltd.; a copolymer of maleic anhydride and isobutylene having a weight average molecular weight of 300,000-350,000) and 0.83 part of polyglycerol polyglycidyl ether (trade name: DENACOL EX-521 manufactured by Nagase Chemtex Co., Ltd.) were mixed to obtain a water-based adhesive for polarizing element of the present invention. Then, a polarizer was obtained using the resulting adhesive in the same manner as in Example 1.

EXAMPLE 4

17 Parts of an aqueous solution containing 5.0% of a PVA resin (having an average polymerization degree of 2600 and a saponification degree of 99.4 mol % or higher), 83 parts of an aqueous ammonium solution containing 5.0% of a resin having a maleic anhydride skeleton in the structure (trade name: ISOBAN-18 manufactured by Kuraray Co., Ltd.; a copolymer of maleic anhydride and isobutylene having a weight average molecular weight of 300,000-350,000) and 2.08 parts of polyglycerol polyglycidyl ether (trade name: DENACOL EX-521 manufactured by Nagase Chemtex Co., Ltd.) were mixed to obtain a water-based adhesive for polarizing element of the present invention. Then, a polarizer was obtained using the resulting adhesive in the same manner as in Example 1.

EXAMPLE 5

A water-based adhesive for polarizing element of the present invention was obtained in the same manner as in Example 1, except that the amount of the polyglycerol polyglycidyl ether was changed to 0.25 part. Then, a polarizer was obtained using the resulting adhesive in the same manner as in Example 1.

EXAMPLE 6

A water-based adhesive for polarizing element of the present invention was obtained in the same manner as in Example 1, except that the amount of the polyglycerol polyglycidyl ether was changed to 2.5 parts. Then, a polarizer was obtained using the resulting adhesive in the same manner as in Example 1.

EXAMPLE 7

Using the water-based adhesive for polarizing element of the present invention, a polarizer was obtained in the same manner as in Example 1, except that the drying after bonding was carried out at 70° C. for 10 minutes.

EXAMPLE 8

A water-based adhesive for polarizing element of the present invention was obtained in the same manner as in Example 1, except that the PVA resin was changed to a modified PVA resin having acetoacetyl group (trade name: Z-200H manufactured by Nippon Synthetic Chemical Industry Co., Ltd.). Then, a polarizer was obtained using the resulting adhesive in the same manner as in Example 1.

EXAMPLE 9

A water-based adhesive for polarizing element of the present invention was obtained in the same manner as in Example 1, except that 1,3-bis(N,N-diglycidylaminomethyl) cyclohexane (trade name: TETRAD-C manufactured by Mitsubishi Gas Chemical Company, Inc.) was used as the crosslinking agent. Then, a polarizer was obtained using the resulting adhesive in the same manner as in Example 1.

EXAMPLE 10

A water-based adhesive for polarizing element of the present invention was obtained in the same manner as in Example 1, except that a copolymer of maleic anhydride and isobutylene having a weight average molecular weight of 55,000-65,000 (trade name: ISOBAN-04 manufactured by Kuraray Co., Ltd.) was used as the resin having a maleic anhydride skeleton in the structure. Then, a polarizer was obtained using the resulting adhesive in the same manner as in Example 1.

EXAMPLE 11

A water-based adhesive for polarizing element of the present invention was obtained in the same manner as in Example 1, except that the resin having a maleic anhydride skeleton in the structure used was a resin in which a part of maleic anhydride was maleimide (trade name: ISOBAN-310 manufactured by Kuraray Co., Ltd.; a copolymer of maleic anhydride and isobutylene in which a part of maleic anhydride was replaced with maleimide and which had a weight average molecular weight of 160,000-170,000). Then, a polarizer was obtained using the resulting adhesive in the same manner as in Example 1.

EXAMPLE 12

50 Parts of an aqueous solution containing 5.0% of a PVA resin (having an average polymerization degree of 2600 and a saponification degree of 99.4 mol % or higher), 50 parts of an aqueous solution containing 5.0% of a resin having maleic anhydride and maleamic acid skeletons in the structure (trade name: ISOBAN-104 manufactured by Kuraray Co., Ltd.; a copolymer of maleic anhydride and isobutylene in which a part of maleic anhydride was replaced with an ammonium salt of maleamic acid and which had a weight average molecular weight of 55,000-65,000) and 1.25 parts of polyglycerol polyglycidyl ether (trade name: DENACOL EX-521 manufactured by Nagase Chemtex Co., Ltd.) were mixed to obtain a water-based adhesive for polarizing element of the present invention. Then, a PVA film having an average polymerization degree of 4000, a saponification degree of 99.9 mol % and a thickness of 75 µm was dyed in an aqueous solution containing a dichroic dye represented by the above formula (1) and Glauber's salt at 45° C., then introduced into an aqueous solution containing 3% by weight of boric acid at 58° C. without a drying step, and uniaxially stretched fivefold in the aqueous solution. This film was washed by further dipping in a water bath of room temperature and dried at 70° C. for 10 minutes to obtain a polarizing element. This polarizing element and a cellulose triacetate film subjected to saponification treatment with an alkali were bonded to each other using the water-based adhesive obtained above, and dried at 70° C. for 5 minutes and, furthermore, at 100° C. for 5 minutes to obtain a polarizer of the present invention. In this case, the boron content in the polarizing element was 16% in terms of concentration of boric acid.

EXAMPLE 13

50 Parts of an aqueous solution containing 5.0% of a PVA resin (having an average polymerization degree of 2600 and a saponification degree of 99.4 mol % or higher), 50 parts of an aqueous ammonium solution containing 5.0% of a resin having a maleic anhydride skeleton in the structure (trade name: ISOBAN-18 manufactured by Kuraray Co., Ltd.; a copolymer of maleic anhydride and isobutylene having a weight average molecular weight of 300,000-350,000) and 1.25 parts of polyglycerol polyglycidyl ether (trade name: DENACOL EX-521 manufactured by Nagase Chemtex Co., Ltd.) were mixed to obtain a water-based adhesive for polarizing element of the present invention. Then, a PVA film having an average polymerization degree of 4000, a saponification degree of 99.9 mol % and a thickness of 75 µm was dyed in an aqueous solution containing a dichroic dye represented by the above formula (1) and Glauber's salt at 45° C., then introduced into an aqueous solution containing 3% by weight of boric acid at 58° C. without a drying step, and uniaxially stretched fivefold in the aqueous solution. This film was further dipped in an aqueous solution containing 5% by weight of boric acid at 55° C. for 5 minutes, washed with water, and then dried at 70° C. for 10 minutes to obtain a polarizing element. This polarizing element and a cellulose triacetate film subjected to saponification treatment with an alkali were bonded to each other using the adhesive obtained above, and dried at 70° C. for 5 minutes and, furthermore, at 100° C. for 5 minutes to obtain a polarizer of the present invention. In this case, the boron content in the polarizing element was 26% in terms of the concentration of boric acid.

EXAMPLE 14

Using the adhesive of the present invention obtained in Example 9, a polarizer of the present invention was obtained in the same manner as in Example 8, except that the treatment of the film with boric acid after the uniaxial stretching in Example 9 was carried out by dipping the film in an aqueous solution containing 8% by weight of boric acid at 40° C. for 5 minutes. In this case, the boron concentration in the polarizing element was 29% in terms of the concentration of boric acid.

EXAMPLE 15

Using the adhesive of the present invention obtained in Example 9, a polarizer of the present invention was obtained in the same manner as in Example 9, except that the treatment of the film with boric acid after the uniaxial stretching in Example 9 was carried out by dipping the film in an aqueous solution containing 8% by weight of boric acid at 55° C. for 5 minutes. In this case, the boron concentration in the polarizing element was 32% in terms of the concentration of boric acid.

Comparative Example 1

A PVA film having an average polymerization degree of 4000, a saponification degree of 99.9 mol % and a thickness of 75 am was dyed in an aqueous solution containing a dichroic dye represented by the above formula (1) and Glauber's salt at 45° C., then introduced into an aqueous solution containing 3% by weight of boric acid at 58° C. without a drying step, and uniaxially stretched fivefold in the aqueous solution. This film was washed by further dipping in a water bath of room temperature, and then dried at 70° C. for 10 minutes to obtain a polarizing element. This polarizing element and a cellulose triacetate film subjected to saponification treatment with an alkali were bonded to each other, using as an adhesive, an aqueous solution containing 5% of a PVA resin (having an average polymerization degree of 2600 and a saponification degree of 99.4 mol % or higher), and dried at 70° C. for 10 minutes and, furthermore, at 100° C. for 10 minutes to obtain a polarizer.

Comparative Example 2

50 Parts of an aqueous solution containing 5.0% of a PVA resin (having an average polymerization degree of 2600 and a saponification degree of 99.4 mol % or higher) and 50 parts of an aqueous ammonium solution containing 5.0% of a resin having a maleic anhydride skeleton in the structure (trade name: ISOBAN-18 manufactured by Kuraray Co., Ltd.; a copolymer of maleic anhydride and isobutylene having a weight average molecular weight of 300,000-350,000) were mixed to obtain a water-based adhesive for polarizing element containing no crosslinking agent. Then, a PVA film having an average polymerization degree of 4000, a saponification degree of 99.9 mol % and a thickness of 75 µm was dyed in an aqueous solution containing a dichroic dye represented by the above formula (1) and Glauber's salt at 45° C., then introduced into an aqueous solution containing 3% by weight of boric acid at 58° C. without a drying step, and uniaxially stretched fivefold in the aqueous solution. This film was washed by further dipping in a water bath of room temperature, and then dried at 70° C. for 10 minutes to obtain a polarizing element. This polarizing element and a cellulose triacetate film subjected to saponification treatment with an alkali were bonded using the above obtained adhesive in the same manner as in Comparative Example 1 to obtain a polarizer.

Test Example 1

The polarizers obtained in Examples 1-15 and Comparative Examples 1-2 were tested on water resistance of adhesion by dipping them in warm water of 60° C. for 120 hours. The results of the test of water resistance of adhesion on the polarizers are shown in Table 1. In the table, "○" means that no change occurred, and "X" means that complete separation occurred.

saponification degree of 99.4 mol % or higher), 50 parts of an aqueous ammonium solution containing 5.0% of a resin having a maleic anhydride skeleton in the structure (trade name: ISOBAN-18 manufactured by Kuraray Co., Ltd.; a copolymer of maleic anhydride and isobutylene having a weight average molecular weight of 300,000-350,000) and 1.25 parts of polyglycerol polyglycidyl ether (trade name: DENACOL EX-521 manufactured by Nagase Chemtex Co., Ltd.) were mixed to obtain a water-based adhesive for polarizing element of the present invention. Then, a PVA film having an average polymerization degree of 4000, a saponification degree of 99.9 mol % and a thickness of 75 μm was dyed in an aqueous solution containing Glauber's salt, C.I. Direct Yellow 28, C.I. Direct Orange 39, and a dichroic dye disclosed in JP-A-2003-215338 and represented by the following formula (2) as a free acid at 45° C. for 4 minutes. Then, the film was washed in an aqueous solution containing 2% by weight of boric acid at 50° C., introduced into an aqueous solution containing 3% by weight of boric acid at 57° C. without a drying step, and uniaxially stretched fivefold in the aqueous

TABLE 1

Table 1: Results of water resistance test on polarizer

| | Results of water resistance test | Solid content of resin component | PVA resin/resin having maleic anhydride skeleton in structure (weight ratio) | Proportion of cross-linking agent based on 100 parts of PVA resin (weight ratio) | Concentration of boric acid in polarizing element |
|---|---|---|---|---|---|
| Example 1 | ○ | 5% | 100/100 | 50 parts | 16% |
| Example 2 | ○ | 4% | 100/100 | 50 parts | 16% |
| Example 3 | ○ | 5% | 100/50 | 25 parts | 16% |
| Example 4 | ○ | 5% | 100/500 | 250 parts | 16% |
| Example 5 | ○ | 5% | 100/100 | 10 parts | 16% |
| Example 6 | ○ | 5% | 100/100 | 100 parts | 16% |
| Example 7 | ○ | 5% | 100/100 | 50 parts | 16% |
| Example 8 | ○ | 5% | Modified PVA resin/same as in Example 1 100/100 | 50 parts | 16% |
| Example 9 | ○ | 5% | 100/100 | Glycidyl adduct of diamine 50 parts | 16% |
| Example 10 | ○ | 5% | Same as in Example 1/resin of low polymerization degree 100/100 | 50 parts | 16% |
| Example 11 | ○ | 5% | Same as in Example 1/imide modified resin 100/100 | 50 parts | 16% |
| Example 12 | ○ | 5% | Same as in Example 1/maleamic acid-containing resin 100/100 | 50 parts | 16% |
| Example 13 | ○ | 5% | 100/100 | 50 parts | 26% |
| Example 14 | ○ | 4% | 100/100 | 50 parts | 29% |
| Example 15 | ○ | 5% | 100/100 | 50 parts | 32% |
| Comparative Example 1 | X | 5% | 100/0 | 0 parts | 16% |
| Comparative Example 2 | X | 5% | 100/100 | 0 parts | 16% |

As shown in Table 1, the polarizers using the water-based adhesive for polarizing element according to the present invention were superior in durability when dipped in warm water of 60° C. for 120 hours irrespective of the content of the boron compound in the polarizing element calculated in terms of boric acid.

EXAMPLE 16

50 Parts of an aqueous solution containing 5.0% of a PVA resin (having an average polymerization degree of 2600 and a solution. This film was further washed by dipping in a water bath of room temperature, and dried at 70° C. for 10 minutes to obtain a polarizing element. This polarizing element and a cellulose triacetate film subjected to saponification treatment with an alkali were bonded to each other using the adhesive obtained above, and dried at 70° C. for 5 minutes and, furthermore, at 100° C. for 5 minutes to obtain a polarizer of the present invention. In this case, the boron content in the polarizing element was 20% in terms of concentration of boric acid.

[Formula 2]

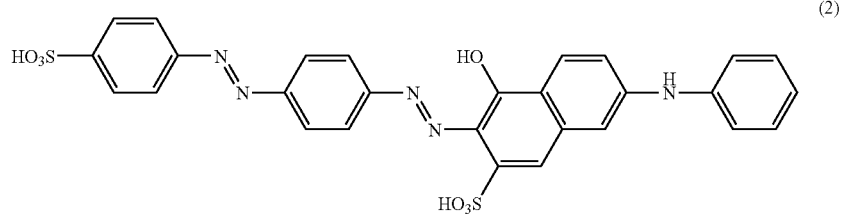

(2)

EXAMPLE 17

A water-based adhesive for polarizing element of the present invention was obtained in the same manner as in Example 16, except for using a resin having maleic anhydride and maleamic acid skeletons in the structure (trade name: ISOBAN-104 manufactured by Kuraray Co., Ltd.; a copolymer of maleic anhydride and isobutylene in which a part of maleic anhydride was replaced with an ammonium salt of maleamic acid and which had a weight average molecular weight of 55,000-65,000). Then, a polarizer was obtained using the resulting adhesive in the same manner as in Example 1.

EXAMPLE 18

A water-based adhesive for polarizing element of the present invention was obtained in the same manner as in Example 16, except for using a resin having maleic anhydride and maleamic acid skeletons in the structure (trade name: ISOBAN-110 manufactured by Kuraray Co., Ltd.; a copolymer of maleic anhydride and isobutylene in which a part of maleic anhydride was replaced with an ammonium salt of maleamic acid and which had a weight average molecular weight of 160,000-170,000). Then, a polarizer was obtained using the resulting adhesive in the same manner as in Example 1.

Comparative Example 3

A polarizer was obtained in the same manner as in Example 16, except that the polarizing element and the cellulose triacetate film subjected to saponification treatment with an alkali were bonded to each other, using as an adhesive, an aqueous solution containing 5% of a PVA resin (having an average polymerization degree of 2600 and a saponification degree of 99.4 mol % or higher).

Test Example 2

Solution viscosity of adhesives obtained in Examples 16-18 and Comparative Example 3 was evaluated by dropping time of the adhesive solution using Zahn Cup No. 3. Adhesion was evaluated on the polarizers obtained in Examples 16-18 and Comparative Example 3 by dipping them in warm water of 60° C. for 960 hours and by leaving them in an environment of 60° C. and 100% RH for 700 hours. The results are shown in Table 2.

TABLE 2

Table 2 Solution viscosity of adhesive and results of adhesion test

| | Water resistance in warm water of 60° C. | Water resistance at 60° C., 100% RH | Solution viscosity of adhesive | Coatability |
|---|---|---|---|---|
| Example 16 | ○ | ○ | 631 seconds | Δ |
| Example 17 | ○ | ○ | 44 seconds | ◎ |
| Example 18 | ○ | ○ | 131 seconds | ○ |
| Comparative Example 3 | X Separation occurred after 16 hours | ○ | 55 seconds | ◎ |

As shown in Table 2, the polarizers made using the water-based adhesive for polarizing element of the present invention were superior in water resistance test in warm water of 60° C. and moisture resistance test in an environment of 60° C. and 100% RH.

EXAMPLE 19

A PVA film having an average polymerization degree of 2400, a saponification degree of 99.4 mol % and a thickness of 75 μm was dyed in an aqueous solution containing iodine, potassium iodide and boric acid at 45° C. for 4 minutes, then introduced into an aqueous solution containing 3% by weight of boric acid at 50° C. without a drying step, and uniaxially stretched fivefold in the aqueous solution. This film was washed by further dipping in a water bath of room temperature, and then dried at 70° C. for 10 minutes to obtain a polarizing element. Then, a polarizer was obtained using the resulting polarizing element in the same manner as in Example 1.

Comparative Example 4

A polarizer was obtained in the same manner as in Example 19, except that the polarizing element and the cellulose triacetate film subjected to saponification treatment with an alkali were bonded to each other, using as an adhesive, an aqueous solution containing 5% of a PVA resin (having an average polymerization degree of 2600 and a saponification degree of 99.4 mol % or higher).

Test Example 3

The polarizers obtained in Example 19 and Comparative Example 4 were dipped in warm water of 60° C. for 1 hour, and adhesion of the outer peripheral portion of the polarizers was evaluated. The results are shown in Table 3.

TABLE 3

Table 3 Results of adhesion test of outer peripheral portion of polarizer

| | State of edge portion |
|---|---|
| Example 19 | Separation did not occur between polarizing element and cellulose triacetate film. |
| Comparative Example 4 | Separation of 1 mm from edge occurred between polarizing element and cellulose triacetate film, and the polarizing element shrank. |

As shown in Table 3, the polarizers made using the water-based adhesive for polarizing element of the present invention was superior also in adhesion in the outer peripheral portion of the polarizer.

INDUSTRIAL APPLICABILITY

The polarizers made using the water-based adhesive for polarizing element of the present invention are excellent in durability, particularly durability in an atmosphere of high humidity. Thus, they can be used in display devices used outdoor or under moisture condensation conditions. Furthermore, deterioration of the polarizers does not occur during transportation or storage at high temperature and high humidity such as in the tropics or the subtropics.

The invention claimed is:

1. A polarizer which comprises a polarizing element and a protective film bonded to the polarizing element with an adhesive, wherein the adhesive is a water-based adhesive for polarizing elements consisting essentially of a polyvinyl alcohol resin, a resin having a maleic anhydride skeleton in the structure, and a crosslinking agent, wherein the resin having a maleic anhydride skeleton in the structure is a copolymer of maleic anhydride and isobutylene.

2. A polarizer according to claim 1, wherein the copolymer of maleic anhydride and isobutylene has a weight average molecular weight of 55,000-350,000.

3. A polarizer according to claim 1, wherein the crosslinking agent is a compound having an epoxy group.

4. A polarizer according to claim 1, wherein the polyvinyl alcohol resin is a modified polyvinyl alcohol resin or a mixture of a polyvinyl alcohol resin and a modified polyvinyl alcohol resin.

5. A polarizer according to claim 1, which comprises the polyvinyl alcohol resin, the resin having a maleic anhydride skeleton in the structure, and the crosslinking agent in a weight proportion of 100/(1-1000)/(0.5-5000).

6. A polarizer according to claim 1, wherein the protective film is a cellulose acetate film.

7. A polarizer according to claim 1, wherein the polarizing element is a polyvinyl alcohol resin film, and the content of boron in the polarizing element is 10-40% by weight in terms of boric acid.

8. A method for bonding a protective film to a polarizing element which comprises bonding the protective film to the polarizing element by use of a water-based adhesive consisting essentially of a polyvinyl alcohol resin, a resin having a maleic anhydride skeleton in the structure, and a crosslinking agent, wherein the resin having a maleic anhydride skeleton in the structure is a copolymer of maleic anhydride and isobutylene.

9. A method according to claim 8, wherein the copolymer of maleic anhydride and isobutylene has a weight average molecular weight of 55,000-350,000.

10. A method according to claim 8, wherein the crosslinking agent is a compound having an epoxy group.

11. A method according to claim 8, wherein the polyvinyl alcohol resin is a modified polyvinyl alcohol resin or a mixture of a polyvinyl alcohol resin and a modified polyvinyl alcohol resin.

12. A method according to claim 8, which comprises the polyvinyl alcohol resin, the resin having a maleic anhydride skeleton in the structure, and the crosslinking agent in a weight proportion of 100/(1-1000)/(0.5-5000).

* * * * *